United States Patent [19]

Ohta et al.

[11] Patent Number: 4,665,106
[45] Date of Patent: May 12, 1987

[54] RADIATION CURABLE PRESSURE-SENSITIVE ADHESIVE COMPOSITION

[75] Inventors: Tomohisa Ohta; Akihiko Dobashi; Hisashige Kanbara, all of Shimodate; Yasuyuki Seki, Hitachi, all of Japan

[73] Assignee: Hitachi Chemical Company, Ltd., Tokyo, Japan

[21] Appl. No.: 757,874

[22] Filed: Jul. 23, 1985

[51] Int. Cl.[4] .............................................. C08E 2/46
[52] U.S. Cl. ........................................ 522/49; 522/54; 522/56; 522/67; 522/149; 522/182; 526/273; 526/318
[58] Field of Search ...................... 522/49, 54, 56, 67, 522/149, 182; 526/318, 273

[56] References Cited

U.S. PATENT DOCUMENTS

| | | | |
|---|---|---|---|
| 3,790,533 | 2/1974 | Samour | 526/318 |
| 3,933,748 | 1/1976 | Matsuda et al. | 526/318 |
| 4,048,259 | 9/1977 | Wegemund et al. | 526/318 |

FOREIGN PATENT DOCUMENTS 59-18775  1/1984  Japan .

*Primary Examiner*—Joseph L. Schofer
*Assistant Examiner*—Bernard Lipman
*Attorney, Agent, or Firm*—Antonelli, Terry & Wands

[57] ABSTRACT

A radiation curable pressure-sensitive adhesive composition comprising a liquid oligomer having one or more acrylic double bonds in its molecule, a chain transfer agent and an aliphatic polar monomer having a carboxyl group can give an adhesive tape excellent in rubber-like properties, high in cohesive force and good in adhesiveness at low temperatures.

6 Claims, No Drawings

RADIATION CURABLE PRESSURE-SENSITIVE ADHESIVE COMPOSITION

BACKGROUND OF THE INVENTION

This invention relates to a radiation curable pressure-sensitive adhesive composition having high cohesion at low temperatures and excellent adhesiveness.

Heretofore, in order to exhibit desired adhesive properties such as cohesive force and peel strength in pressure-sensitive adhesive tapes, it has been necessary to use a polymer having a relatively high molecular weight and viscosity (e.g., natural rubber, synthetic rubber, etc.). Therefore, in coating, the polymer should be applied to a substrate in the form of a solution in an organic solvent. Further, since a large amount of the solvent used is allowed to evaporate, a long period of time is required for a drying step after the coating. Moreover, solvents used for the above mentioned purpose are volatile and flammable and many of them have harmful effects on human body, so that their use often causes a fire or various environmental pollution problems. Further, a solvent-recovering apparatus which is regarded as necessary from the viewpoint of economics and preventing the above-mentioned environmental pollution is generally expensive and requires a wide space for its provision. Accordingly, so-called solventless pressure-sensitive adhesives have been noted in recent years from the viewpoints of saving-resources, saving-energy and preventing-environmental pollution. In order to make solventless adhesives, there have been used emulsion type, hot melt type and the like adhesives. Particularly, a radiation curable pressure-sensitive adhesive applying a liquid oligomer having one or more unsaturated double bonds in its molecule is now of interest. This is because the radiation curable pressure-sensitive adhesive does not contain, in principle, an organic solvent which causes defects of the above-mentioned solvent-type pressure-sensitive adhesives, or even if it contains the solvent, the amount of the solvent is very small. Further, there are the following advantages: (1) since radiation which is actinic energy rays is used, the curing (polymerization) reaction is fast, (2) since the curing reaction proceeds only when irradiated with radiation, the pot life can be controlled freely, (3) no large dryer is necessary for the production, etc.

But even the radiation curable pressure-sensitive adhesive has the following disadvantages. The polymerization (curing) reaction generally proceeds by addition of radicals generated by irradiation to unsaturated double bonds, but in this case the reaction rate is so fast that excess crosslinking easily takes place, which results in raising the glass transition point. Therefore, the formed adhesive layer film becomes brittle, and in an extreme case, cracks are formed due to large polymerization shrinkage. When adhesive layer film properties are measured in such a state, the film has large breaking strength but hardly shows elongation and rubber-like properties. On the other hand, when the absolute amount of unsaturated double bonds in the molecule is reduced in order to suppress the excess crosslinking, the reaction proceeds locally, which results in failing to obtain sufficient cohesive force as a whole.

As mentioned above, it as difficult to suppress the curing reaction suitably while maintaining adhesive properties as a pressure-sensitive adhesive.

In order to solve such problems, some of the present inventors have proposed a pressure-sensitive adhesive comprising a radiation curable oligomer, a chain transfer agent and a polar group-containing monomer in order to carry out the curing reaction uniformly and to enhance interfacial force (Japanese Patent Appln No. 128224/82, Japanese Patent Examined Publication No. 25070/85). But even such a pressure-sensitive adhesive has a problem of lowering peel strength in a cold district or in the wintertime.

SUMMARY OF THE INVENTION

It is an object of this invention to provide a radiation curable pressure-sensitive adhesive composition having excellent rubber-like properties and high peel strength and excellent adhesive properties at low temperatures.

This invention provides a radiation curable pressure-sensitive adhesive composition comprising.

100 parts by weight of a liquid oligomer having one or more acryloyl double bonds in its molecule, 0.2 to 20 parts by weight of a chain transfer agent, and 0.5 to 30 parts by weight of an aliphatic polar monomer having a carboxyl group and represented by the formula:

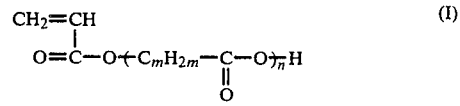

wherein m is an integer of 4 to 10; and n is an integer of 1 to 20.

DESCRIPTION OF THE PREFERRED EMBODIMENTS

The aliphatic polar monomer of the formula:

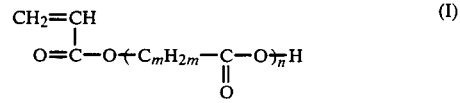

wherein m is an integer of 4 to 10; and n is an integer of 1 to 20, can be synthesized by reacting a cyclic saturated aliphatic lactone of the formula:

wherein m is an integer of 4 to 10, with acrylic acid by a conventional process. In the formula (I), n is usually an integer of 1, but n can be an integer of 2 to 20 when side products are produced by the synthesis.

Examples of the aliphatic polar monomer of the formula (I) are 5-acryloyloxypentanoic acid, 6-acryloyloxyhexanoic acid, 11-acryloyloxyundecanoic acid, etc.

The aliphatic polar monomer of the formula (I) is used in an amount of 0.5 to 30 parts by weight per 100 parts by weight of the liquid oligomer. When the amount is less than 0.5 part by weight, the adhesive properties at low temperaures are lowered, while when the amount is more than 30 parts by weight, the curing properties are lowered. Preferable amount of the aliphatic polar monomer is 1 to 20 parts by weight, more preferably 5 to 15 parts by weight, per 100 parts by weight of the liquid oligomer.

The liquid oligomer having one or more acryloyl unsaturated double bonds in its molecule includes oligomers obtained by copolymerizing an alkyl acrylate or alkyl methacrylate as a main chain in a low degree of polymerization, oligomers having one or more unsaturated double bonds in one molecule in a main chain or side chain such as polyol acrylates, polyester acrylates, urethane acrylates, and epoxy acrylates.

The oligomer is liquid under normal conditions and requires no solevent or if used in a very small amount. The viscosity of the liquid oligomer is in the range of preferably $10^2$ cps to $5 \times 10^5$ cps at room temperature (25° C.). Particularly preferable results can be obtained when the oligomer is highly reactive and has one or more acrylic double bonds.

Such an oligomer can be produced by the following processes.

(1) A process which comprises copolymerizing an acrylic ester compound, a monomer having a carboxyl group and if necessary, other monomers in a suitable organic solvent by a conventional solution polymerization method, and then reacting a part of the carboxyl groups of the resulting copolymer with a monomer having an epoxy group in the presence of a polymerization inhibitor and a catalyst to introduce one or more olefinic unsaturated bonds to side chains.

(2) A process which comprises copolymerizing an acrylic ester compound, a monomer having an epoxy group, and if necessary, other monomers as mentioned above, and then reacting a part of the epoxy groups of the resulting copolymer with a monomer having a carboxyl group in the same manner as described above to introduce one or more olefinic unsaturated bonds into side chains.

(3) A process which comprises copolymerizing an acrylic ester compound, a monomer having a hydroxyl group and if necessary, other monomers as mentioned above, and then reacting a part of the hydroxyl groups of the resulting copolymer with a 1:1 addition reaction product of a diisocyanate such as tolylene diisocyanate, or hexamethylene diisocyanate and a monomer having a hydroxyl group (a half urethane) in the same manner as described above to introduce one or more olefinic unsaturated bonds into side chains.

(4) A process according to (1), (2) or (3), wherein a monomer having an amino group is substituted for a part of the above-mentioned monomer having a carboxyl group in (1), monomer having an epoxy group in (2) or monomer having a hydroxyl group in (3).

Examples of the acrylic ester compound are methyl acrylate, methyl methacrylate, ethyl acrylate, ethyl methacrylate, butyl acrylate, butyl methacrylate, isobutyl acrylate, isobutyl methacrylate, octadecyl acrylate, octadecyl methacrylate, 2-ethylhexyl acrylate, 2-ethylhexyl methacrylate, etc. In this invention, it is preferable to contain 60% by weight or more of the acrylic ester compound in the main chain of the oligomer.

Examples of the monomer having a carboxyl group are acrylic acid, methancrylic acid, etc.

Examples of the monomer having an epoxy group are glycidyl acrylate, glycidyl methacrylate, etc.

Examples of the monomer having a hydroxyl group are 2-hydroxyethyl acrylate, 2-hydroxylethyl methacrylate, 2-hydroxypropyl acrylate, 2-hydroxypropyl methacrylate, etc.

Examples of the monomer having an amino group are dimethylaminoethyl acrylate, dimethylaminoethyl methacrylate, diethylaminoethyl acrylate, diethylaminoethyl methacrylate, etc.

As the chain transfer agent, there can be used thiol compounds such as butyl mercaptan, lauryl mercaptan, octyl thioglycolate, ethylene glycol dithioglycolate, 1,4-butanediol dithiopropionate, trimethylolpropane tris(thioglycolate), trimethylolpropane tris($\beta$-thiopropionate), pentaerythritol tetrakis($\beta$-thiopropionate), etc., disulfides such as diphenyl disulfide, etc.; halides such as carbon tetrachloride, carbon tetrabromide, chloroform, etc. These compounds can be used alone or as a mixture thereof.

The chain transfer agent is added to suppress excess crosslinking at the time of radiation curing. The amount of the chain transfer agent is 0.2 to 20 parts by weight, preferably 2 to 15 parts by weight, per 100 parts by weight of the liquid oligomer. When the amount is less than 0.2 part by weight, the effect for suppressing crosslinking becomes insufficient, whereas when the amount is more than 20 parts by weight, the adhesive properties are badly influenced due to insufficient curing and insufficient cohesive force.

The radiation curable pressure-sensitive adhesive composition may further contain one or more monomers for dilution, and if necessary, one or more viscosity imparting agentC, softening agents, antioxidants, fillers, pigments, and the like additives.

The radiation used in this invention is actinic energy rays including an ionizing radiation such as $\alpha$-rays, $\beta$-rays, $\gamma$-rays, neutron rays, acceleated electron beams or the like. The ionizing radiation can be used in a dose in the range from 0.5 to 50 Mrad, preferably about 1 to 20 Mrad. If necessary, the adhesive composition may contain a curing accelerator. In the case of irradiation with radiation, care should be taken particularly in an irradiation atmosphere. Since the radicals produced by irradiation are badly influenced by oxygen in the air, the air may be replaced by an inert gas such as nitrogen gas, or in some case, the film to be treated may be covered with a film or the like to remove oxygen.

This invention is illustrated by way of the following Examples, in which all parts and percents are by weight unless otherwise specified.

EXAMPLES 1 TO 3, COMPARATIVE EXAMPLES 1 AND 2

A solventless acrylic copolymer was synthesized by bulk polymerization of 80 parts of butyl acrylate and 20 parts of glycidyl methacrylate in the presence of a catalyst. The resulting liquid oligomer had a viscosity of $5 \times 10^4$ cps (30° C.). Then, 10 parts of acrylic acid was addition reacted to synthesize an acrylic radiation curable liquid oligomer having unsaturated double bonds at side chains. To 100 parts of the oligomer, 10 parts of ethylene glycol dithioglycolate as a chain transfer agent and 20 parts of 5-acryloyloxypentanoic acid (Example 1), 6-acryloyloxyhexanoic acid (Example 2) or 11-acryloyloxyundecanoic acid (Example 3) were added to give each radiation curable pressure-sensitive adhesive composition.

For comparison, an adhesive composition was prepared in the same manner as described in Example 1 except for not using ethylene glycol dithioglycolate (Comparative Example 1).

Further, an adhesive composition was prepared in the same manner as described in Example 1 except for using acid phosphoxydiethyl methacrylate (HOSMER M, a trade name, manufactured by Yushi Seihin K.K.) in place of the cyclic aliphatic lactone modified monomer (Comparative Example 2).

cohesion of the adhesive tapes were measured. The results were shown in Table 2.

TABLE 2

| Example No. | Initial peel strength[1] (g/25 mm wide) | Adhesion at low temp.[2] (0° C./20° C.) | Change of peel strength with the lapse of time[3] (%) | Cohesion test[4] (mm/10 × 20 mm) |
| --- | --- | --- | --- | --- |
| Example 1 | 440 | 1.8 | 105 | 0.02 |
| Example 2 | 450 | 2.0 | 105 | 0.02 |
| Example 3 | 420 | 2.5 | 106 | 0.02 |
| Comparative Example 1 | 300 | 0.3 | 110 | 0.03 |
| Comparative Example 2 | 420 | 0.5 | 108 | 0.02 |

Note to Table 2:
[1]Measured according to JIS C-2107 (20° C.) (Adhered: SUS 430 BA plate).
[2]An adhesive tape was adhered to the SUS plate at 0° C. and peel strength was measured at 0° C. and compared with the value obtained in above [1]. (The larger the value, the better.)
[3]A heat accelerating test at 65° C. was carried out for 7 days to measure an increase of peel strength in percentage. (The smaller the increase, the better.)
[4]An adhesive tape was adhered to a phenol resin plate and a slide distance after 30 minutes under a load of 500 g at 20° C. was measured.

Using the above-mentioned adhesive compositions, films were formed and their properties were tested as follows.

A film was formed by coating each composition on a release paper treated with a silicone in a constant thickness (about 1 mm), and irradiating electron beams from a linear filament type electron beam irradiating apparatus (Electron Curtain, a trade name, manufactured by Energy Science Inc.) at a dose of 5 Mrad with an accelerated voltage of 160 kV and a beam current of 10 mA in a nitrogen gas atmosphere (oxygen concentration: 500 ppm) to carry out polymerization and crosslinking. Elongation and tensile strength of each adhesive layer film were measured by using a Tensilon tensile tester.

The results were as shown in Table 1. The rate of tension was 200 mm/min (20° C.).

TABLE 1

| Example No. | Elongation (%) | Tension strength (kg/cm$^2$) |
| --- | --- | --- |
| Example 1 | 800 | 5.70 |
| Example 2 | 820 | 5.55 |
| Example 3 | 850 | 5.50 |
| Comparative Example 1 | 450 | 5.85 |
| Comparative Example 2 | 800 | 5.45 |

It was found that the compositions of each Example had rubber-like properties sufficiently. Therefore, adhesive tapes were produced by coating each composition on a polyester film of 0.025 mm in thickness (Lumilar #25, a trade name, manufactured by Toray Industries, Inc.) so as to give an adhesive layer of 0.015 mm thick, and irradiating the composition with electron beams in the same manner as described above. Peel strength and As is clear from Table 2, the pressure-sensitive adhesive composition of this invention can give adhesive tapes having constant cohesive force, good in adhesiveness at low temperatures and little in the change with the lapse of time.

EXAMPLES 4 TO 6, COMPARATIVE EXAMPLES 3 AND 4

An acrylic radiation curable liquid oligomer was synthesized by polymerizing 40 parts of butyl acrylate, 40 parts of 2-ethylhexyl acrylate and 20 parts of glycidyl methacrylate in the same manner as described in Example 1 and adding 10 parts of acrylic acid thereto.

Each radiation curable pressure-sensitive adhesive composition was prepared by adding 10 parts of carbon tetrabromide and 10 parts of 5-acryloyloxypentanoic acid (Example 4), 6-acryloyloxyhexanoic acid (Example 5) or 11-acryloyloxyundecanoic acid (Example 6) to the oligomer.

For comparison, an adhesive composition was prepared in the same manner as described in Example 4 except for not adding carbon tetrabromide (Comparative Example 3), or except for using acryloyloxyethyl hydrogen phthalate in place of the cyclic aliphatic lactone modified monomer (Comparative Example 4).

The properties of adhesive layer films obtained from individual adhesive compositions were tested. Further, each adhesive composition was coated on a polyethylene film of 0.06 mm thick so as to give an adhesive layer of 0.005 mm, followed by irradiation with electron beams to prepare an adhesive film for surface protection.

Properties of the resutling adhesive films were tested and shown in Table 3.

TABLE 3

| Example No. | Example 4 | Example 5 | Example 6 | Comparative Example 3 | Comparative Example 4 |
| --- | --- | --- | --- | --- | --- |
| Elongation (%) | 900 | 950 | 960 | 480 | 900 |
| Tension strength (kg/cm$^2$) | 7.20 | 7.26 | 7.3 | 6.45 | 7.3 |
| Initial peel strength (g/25 mm) | 120 | 110 | 105 | 80 | 115 |
| Adhesion at low temp. (0° C./20° C.) | 2.2 | 2.4 | 2.6 | 0.4 | 0.7 |
| Changes of peel strength with the lapse of time (%) | 105 | 105 | 108 | 115 | 105 |
| Erichsen squeezing test[5] | No change | No change | No change | Wholly | No change |

TABLE 3-continued

| Example No. | Example 4 | Example 5 | Example 6 | Comparative Example 3 | Comparative Example 4 |
|---|---|---|---|---|---|
| | | | | | peeled off |

Note:
(5)A SUS plate to which each adhesive film had been attached was subjected to a 8 mm Erichsen squeezing test according to JIS B7777, and the conditions of spontaneous peeling off of the film after 24 hours was observed.

As is clear from Table 3, the pressure-sensitive adhesive composition of this invention can give adhesive tapes good in adhesion at low temperatures, little in the change of adhesive force with the lapse of time and good in Erichsen squeezing test.

What is claimed is:

1. A radiation curable pressure-sensitive adhesive composition comprising:
   100 parts by weight of a liquid oligomer having one or more acryloyl double bonds in its molecule,
   0.2 to 20 parts by weight of a chain transfer agent, and
   0.5 to 30 parts by weight of an aliphatic polar monomer having a carboxyl group and selected from the group consisting of 5-acryloyloxypentanoic acid, 6-acryloyloxyhexanoic acid and 11-acryloyloxyundecanoic acid.

2. A composition according to claim 1, wherein the liquid oligomer has a viscosity of $10^2$ to $5 \times 10^5$ centipoises at room temperature.

3. A composition according to claim 1, wherein the chain transfer agent is a thiol compound, a disulfide or a halide.

4. A composition according to claim 1, wherein the liquid oligomer is a copolymer obtained from monomers selected from the group consisting of butyl acrylate, glycidyl methacrylate, 2-ethylhexyl acrylate and acrylic acid.

5. A composition according to claim 1, wherein the liquid oligomer is obtained by copolymerizing an alkyl acrylate or alkyl methacrylate as a main chain in a low degree of polymerization.

6. A composition according to claim 1, wherein the liquid oligomer is an oligomer having one or more unsaturated double bonds in one molecule in a main chain or side chain.

* * * * *